(12) United States Patent
Pollock et al.

(10) Patent No.: US 6,989,648 B2
(45) Date of Patent: Jan. 24, 2006

(54) LOAD ANGLE DETERMINATION FOR ELECTRICAL MOTORS

(75) Inventors: Charles Pollock, Rutland (GB); John David Wale, South Coldfield (GB)

(73) Assignee: The University of Leichester, Leichester (GB)

(*) Notice: Subject to any disclaimer, the term of this patent is extended or adjusted under 35 U.S.C. 154(b) by 124 days.

(21) Appl. No.: 10/169,941

(22) PCT Filed: Jan. 11, 2001

(86) PCT No.: PCT/GB01/00110

§ 371 (c)(1),
(2), (4) Date: Sep. 27, 2002

(87) PCT Pub. No.: WO01/51943

PCT Pub. Date: Jul. 19, 2001

(65) Prior Publication Data

US 2003/0076068 A1 Apr. 24, 2003

(30) Foreign Application Priority Data

Jan. 11, 2000 (GB) .............................................. 0000399

(51) Int. Cl.
*G05B 19/40* (2006.01)

(52) U.S. Cl. ....................... 318/685; 318/254; 318/138; 318/439; 318/700

(58) Field of Classification Search ................. 318/685, 318/254, 138, 439, 700
See application file for complete search history.

(56) References Cited

U.S. PATENT DOCUMENTS

| 4,450,396 A | * | 5/1984 | Thornton | 318/721 |
| 4,654,566 A | * | 3/1987 | Erdman | 318/254 |
| 4,670,696 A | * | 6/1987 | Byrne et al. | 318/701 |
| 4,712,050 A | * | 12/1987 | Nagasawa et al. | 318/254 |
| 4,922,169 A | * | 5/1990 | Freeman | 318/254 |
| 4,928,043 A | * | 5/1990 | Plunkett | 318/254 |
| 5,140,244 A | * | 8/1992 | Lyons et al. | 318/761 |
| 5,202,612 A | * | 4/1993 | Yoshida et al. | 318/138 |
| 5,296,793 A | * | 3/1994 | Lang | 318/725 |
| 5,376,866 A | * | 12/1994 | Erdman | 318/254 |
| 5,384,527 A | * | 1/1995 | Rozman et al. | 322/10 |
| 5,434,504 A | * | 7/1995 | Hollis et al. | 324/207.17 |
| 5,637,974 A | * | 6/1997 | McCann | 318/701 |
| 6,121,736 A | * | 9/2000 | Narazaki et al. | 318/254 |
| 6,137,257 A | * | 10/2000 | Heber et al. | 318/701 |
| 6,236,183 B1 | * | 5/2001 | Schroeder | 318/721 |

FOREIGN PATENT DOCUMENTS

| EP | 0 140 159 B | 7/1987 |
| EP | 0 392 367 A | 10/1990 |
| GB | 2 163 264 A | 2/1986 |

* cited by examiner

*Primary Examiner*—Rita Leykin
(74) *Attorney, Agent, or Firm*—Squire, Sanders & Dempsey L.L.P.

(57) ABSTRACT

An electrical motor comprises a stator 1 and a rotor 2, the stator 1 having poles 3 facing circumferential surfaces of the rotor 2 so that the stator 1 forms a magnetic circuit with the rotor 2. The stator 1 further has stator windings 5 grouped into two or more phase windings A, B, which phase windings are separately energisable to induce stator magnetic fields which interact with magnetic fields associated with the rotor 2. A voltage across a stator phase winding is detected by voltage detecting means. Processing means 18 to 20 is provided for determining from one or more voltage measurements the rotor flux linking said stator phase winding, or a value which is a function of the rotor flux linkage, when the excitation current in said stator phase winding is at a known point in its cyclic variation chosen to substantially eliminate from the rotor flux or said function inductive and/or resistive contributions, and for determining from the rotor flux linkage or said function thereof the load angle of the motor.

22 Claims, 4 Drawing Sheets

LOAD ANGLE DETERMINATION FOR ELECTRICAL MOTORS

The present invention relates to load angle determination for electrical motors and in particular, though not exclusively, to load angle determination for hybrid stepping motors.

The hybrid stepping motor is an example of a synchronous motor, a class of electrical motor in which the rotation of the rotor is in synchronisation with the excitation applied to the phase windings of the motor stator. FIG. 1 illustrates a transverse cross-section through one end of a typical two-phase hybrid stepping motor.

The two-phase hybrid stepping motor of FIG. 1 consists of a stator 1 and a rotor 2, both of which are constructed from stacked laminations of electrical grade steel. The stator has eight poles 3, four for each phase, which widen at the tips to a group of teeth 4. Each stator pole 3 has a winding in the form of a short-pitched phase coil 5. These coils 5 are connected, usually in series, to form two electrically independent motor phase windings A and B. The rotor has a large number of radially spaced teeth 6 (typically 50) at each of its ends, and incorporates a permanent magnet 7 which produces static flux along the axis of the machine. The teeth 6 at one end of the rotor 2 are offset by half a tooth pitch with respect to the teeth 6 at the other end of the rotor 2. The rotor tooth pitch is the same as the tooth pitch of the stator 1.

With the number of rotor teeth 6 chosen to be a non-integer multiple of four, and with regular angular displacement of the stator poles 3, an arrangement is created such that two stator poles 3 of one phase A can be set with their teeth 4 in alignment with the teeth 6 at one end of the rotor 2 whilst the teeth 4 of the other pair of stator poles 3 of the same phase A are in alignment with the teeth 6 at the other end of the rotor 2. In this position, all teeth 4 of the pair of stator poles 3 of the other phase B are equally unaligned with the rotor teeth 6 at both ends of the rotor 2. This is the position shown in FIG. 1.

It will be appreciated that the excitation current applied to the phase windings A and B must be in synchronisation with the rotor position to achieve smooth rotation of the rotor 2 within the stator 1. More particularly, the excitation current applied to a phase must alternate in a phased relationship with the degree of alignment between the teeth of that phase and the rotor teeth. In practice, it is found that the "load angle", i.e. the phase difference between a phase excitation current and the rotor flux position with respect to a phase winding, is optimally around 80° (NB. a load angle of 0° would mean that the excitation current in the phase winding is a maximum when the teeth alignment of the stator poles of that winding is at a maximum, whilst a load angle of 90° would mean that the excitation current is a minimum when the teeth alignment is at a maximum).

An alternative way of describing the load angle is as the angle (in electrical degrees) between the stator flux and the rotor flux. For a given stator excitation current the load angle will be determined by the torque applied to the motor shaft. The torque available at a given speed and stator phase current reaches a maximum when the rotor flux lags the stator flux by 90°. If the load torque is removed, while the current is not reduced the load angle will drop to be closer to 0°. This is the mode in which a conventional stepping motor is controlled, in that the phase current will normally be set to be equal to the rated maximum value irrespective of the load on the shaft. As the load varies the torque demanded by the load determines the magnitude of the load angle. A conventional stepping motor may operate for considerable periods with low values of load torque but with maximum current in the phase windings. Operation in this manner is very inefficient; an improved system would detect the load torque by measurement of the load angle and reduce the current until the load angle increased towards its maximum value.

FIG. 2 illustrates a control arrangement for driving a two-phase hybrid stepping motor 8, the arrangement comprising a drive controller 9, a user input 10 for feeding input data to the controller 9, a power supply 11, and a power converter 12. In certain advanced drive constructions, the drive controller 9 receives a rotor position signal (shown by the broken line in FIG. 2) from which the load angle is determined. In such advanced systems, the amplitude of the excitation current for a given phase winding is dynamically adjusted to maintain the load angle at an optimal value (i.e. around 80°). The position of the rotor 2 within the stator 1 may, for example, be determined using an optical sensor coupled to the rotor. However, it is preferred to use a sensorless scheme which relies upon the phenomenon that movement of the rotor 2, carrying the rotor permanent magnet, within the stator 1 causes a change in flux linkage in the machine windings. This change of flux linkage can be demonstrated by using an external drive to rotate the rotor 2 whilst simultaneously measuring the voltage induced in a stator winding using an oscilloscope. This voltage is known as the rotational emf and is the differential of the rotor flux linking a stator phase winding with respect to time. Whilst this can be observed at the terminals of a stator phase winding when the stepping motor is driven by an external machine, it is masked by other voltages when the motor is running normally.

Under normal running conditions, the terminal voltage across a phase of an electrical machine is given by:

$$v_{AT} = e_{AR} + L_A \frac{di_A}{dt} + i_A R_A + M \frac{di_B}{dt} \qquad (1)$$

where the subscripts A and B denote the first and second phase windings respectively, and M is the mutual inductance between the first and second phase windings. The required load angle information can be found if the rotational emf term in the first phase winding ($e_{AR}$) can be electronically separated from the other three terms in equation (1). In a practical sensorless load angle estimator scheme, this process is complicated by the fact that the inductance L of a phase winding depends in a non-linear manner on the current i flowing through the phase winding and furthermore that the resistance R of the phase winding depends upon the temperature.

Previous sensorless estimator schemes have either ignored the dependence of phase inductance L on current i, resulting in significant errors, or have required the use of a machine-specific model which describes the non-linear characteristics of a motor core, resulting in a computationally intensive implementation and also a lengthy drive commissioning process.

Other classes of electrical motors, and in particular synchronous motors, have a similar requirement for synchronising phase excitation with rotor position. Such classes of motors therefore have a similar requirement for determining the load angle.

It is an object of the present invention to overcome or at least mitigate the above noted disadvantages of existing load angle determination schemes. In particular, it is an object of the present invention to provide a sensorless load angle detection scheme which is less computationally intense and/or more accurate than existing sensorless load angle determination schemes.

According to a first aspect of the present invention there is provided an electrical motor system comprising:

a rotor and a stator, the stator having poles facing circumferential surfaces of the rotor so that the stator forms a magnetic circuit with the rotor, the stator further having stator coils grouped into one or more phase windings, which phase windings are separately energisable to induce stator magnetic fields which interact with magnetic fields associated with the rotor;

voltage detecting means for detecting a voltage across the or at least one stator phase winding; and processing means for determining from one or more voltage measurements the rotor flux linking said stator phase winding, or a value which is a function of the rotor flux linkage, when the excitation current in said stator phase winding is at a known point in its cyclic variation, chosen to substantially eliminate from the rotor flux or said function inductive and/or resistive contributions, and for determining from the rotor flux linkage or said function thereof the load angle of the motor.

The present invention results from an understanding that when the excitation current in a phase winding is substantially zero, resistive and inductive effects are either not present or can be easily compensated for. The resistive voltage drop at zero current is zero and the inductive voltage drop can be calculated from the unsaturated inductance of the phase winding. There is thus no requirement for the complex modelling of non-linear motor properties.

In certain embodiments of the invention, the phase winding terminal voltage is sampled at those points where the excitation current is substantially zero. The voltage detected at each point is the sum of the voltages due to the rates of change of both the rotor flux linkage and the excitation current (given that the third and fourth terms in equation (1) are both zero). The term relating to the excitation current is scaled by the phase winding inductance which must be known to find the load angle. However, as the inductance at zero excitation current is linear and fully predictable, this compensation is not difficult to achieve. It will be appreciated that the invention may be advantageously employed by sampling the phase winding terminal voltage close to those points where the excitation current is substantially zero, e.g. + or −10 degrees.

In certain other embodiments of the present invention, the phase winding terminal voltage is sampled at discrete points where the excitation current is known. The voltage detected at each point is given by equation (1). By carefully selecting the discrete points, equation (1) can be simplified. For example, if the currents in a two phase motor are quadrature sine waves, then choosing the discrete points to be 45° displaced from a zero crossing point will result in either the derivative terms or the resistive terms of the two phase measurements being equal or opposite. The derivative terms of the two phase voltage equations can be cancelled by addition or subtraction, leaving a value which is a function of the two phase windings' back emf and the resistive voltage drops in the two windings.

In certain other embodiments of the present invention, the voltage is detected across a phase winding and is integrated over the time period between two successive zero crossings of the phase winding excitation current waveform. The result represents the flux linkage due to the rotor at the second of the excitation current zero crossing points, plus the integral of the resistive volt drop. The result may be corrected for the resistive volt drop by subtracting a value from the detected phase voltage which is proportional to the phase excitation current. Alternatively, the uncompensated integral may be obtained and subsequently corrected for the resistive volt drop by subtracting a value related to a phase excitation current and integration period. The result of either technique is a value which represents the flux linkage contribution of the rotor at the second of the zero crossing points of the excitation current.

In certain embodiments of the invention, the load angle is determined using both a flux linkage measurement and a measurement which is a function of the flux linkage at the zero crossing points of the phase winding excitation current.

Preferably, said processing means is arranged to determine the load angle by fitting a predefined function to the flux linkage measurement, or function of the flux linkage, obtained at the phase winding excitation current crossing points. The load angle can then be determined from the phase shift between the fitted function and the excitation current in the phase winding. The function may be a sinusoid.

Preferably, the electrical motor system of the present invention comprises a hybrid stepping motor. More preferably, the motor comprises a two-phase drive which is arranged to be excited with quadrature current waveforms.

According to a second aspect of the present invention there is provided a method of controlling an electrical motor which comprises a rotor and a stator, the stator having poles facing circumferential surfaces of the rotor so that the stator forms a magnetic circuit with the rotor, the stator further having stator coils grouped into two or more phase windings, the method comprising the steps of:

separately energising the stator phase windings to induce stator magnetic fields which interact with magnetic fields associated with the rotor;

detecting a voltage across a stator phase winding;

determining from one or more voltage measurements the rotor flux linkage, or a value which is a function of the rotor flux linkage, when the excitation current in said stator phase winding is substantially zero; and determining from the flux linkage or said function thereof the load angle of the motor.

According to a third aspect of the present invention there is provided a control system for an electrical motor having a rotor and a stator, the stator having poles facing circumferential surfaces of the rotor so that the stator forms a magnetic circuit with the rotor, the stator further having stator coils grouped into two or more phase windings, which phase windings are separately energisable to induce stator magnetic fields which interact with magnetic fields associated with the rotor, the control system comprising:

voltage detecting means for detecting a voltage across a stator phase winding; and processing means for determining from one or more voltage measurements the rotor flux linkage for said stator phase winding, or a value which is a function of the rotor flux linkage, when the excitation current in said stator phase winding is substantially zero, and for determining from the rotor flux linkage or said function thereof the load angle of the motor.

According to a fourth aspect of the present invention there is provided an electrical motor system comprising:

a rotor and a stator, the stator having poles facing circumferential surfaces of the rotor so that the stator forms a magnetic circuit with the rotor, the stator further having stator coils grouped into two or more phase windings, which phase windings are separately energisable to induce stator magnetic fields which interact with magnetic fields associated with the rotor;

voltage detecting means for detecting a voltage across at least two stator phase windings at points substantially + or −45 degrees shifted from the zero crossing point(s) of the phase winding excitation current; and processing means arranged to determine the load angle by adding or subtracting simultaneous voltage measurements for the two phases.

According to a fifth aspect of the present invention there is provided a method of controlling an electrical motor which comprises a rotor and a stator, the stator having poles facing circumferential surfaces of the rotor so that the stator forms a magnetic circuit with the rotor, the stator further having stator coils grouped into two or more phase windings, the method comprising the steps of:

separately energising the stator phase windings to induce stator magnetic fields which interact with magnetic fields associated with the rotor;

detecting a voltage across at least two stator phase windings;

determining from at least two voltage measurements a simple function of the load angle of the motor.

For a better understanding of the present invention and in order to show how the same may be carried into effect reference will now be made, by way of example, to the accompanying drawings, in which.

The structure of a conventional hybrid stepping motor has been described above with reference to FIG. 1, whilst a control system suitable for controlling a hybrid stepping motor has been described with reference to FIG. 2.

Figure 1:
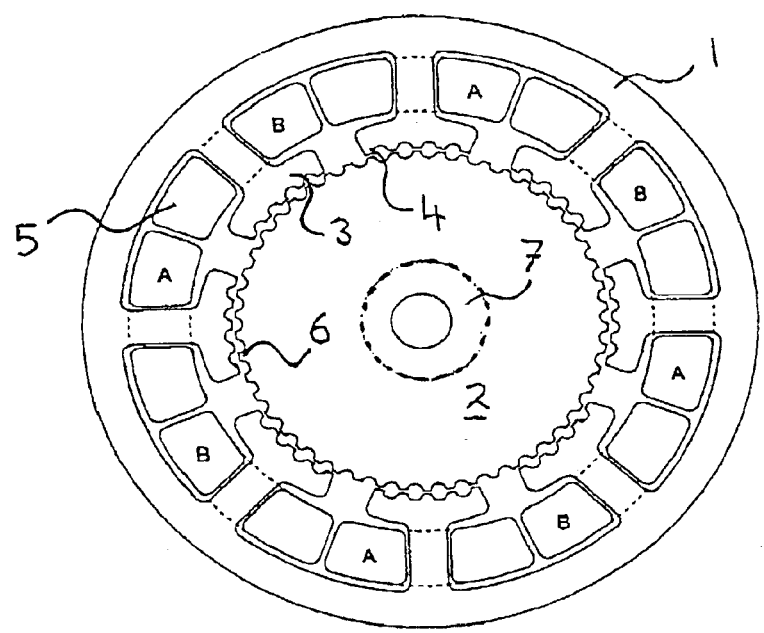
FIG. 1 illustrates schematically a transverse cross-section through a hybrid stepping motor.
Figure 2:
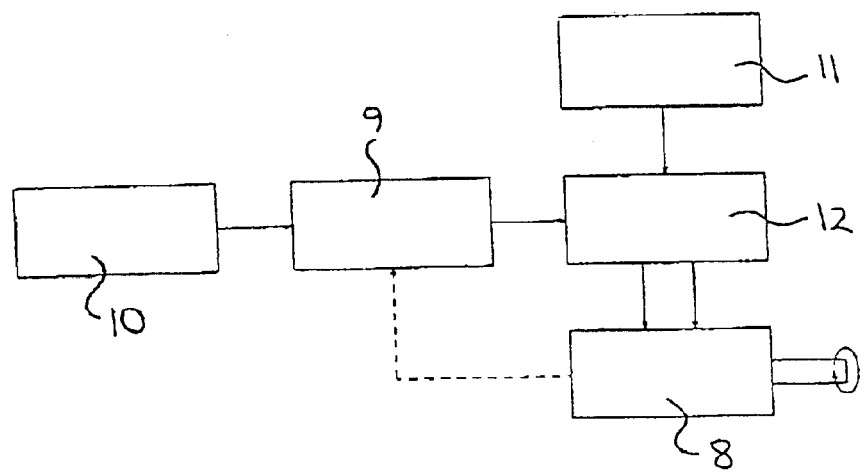
FIG. 2 illustrates in block diagram form a control system for the hybrid stepping motor of FIG. 1.
Figure 3:
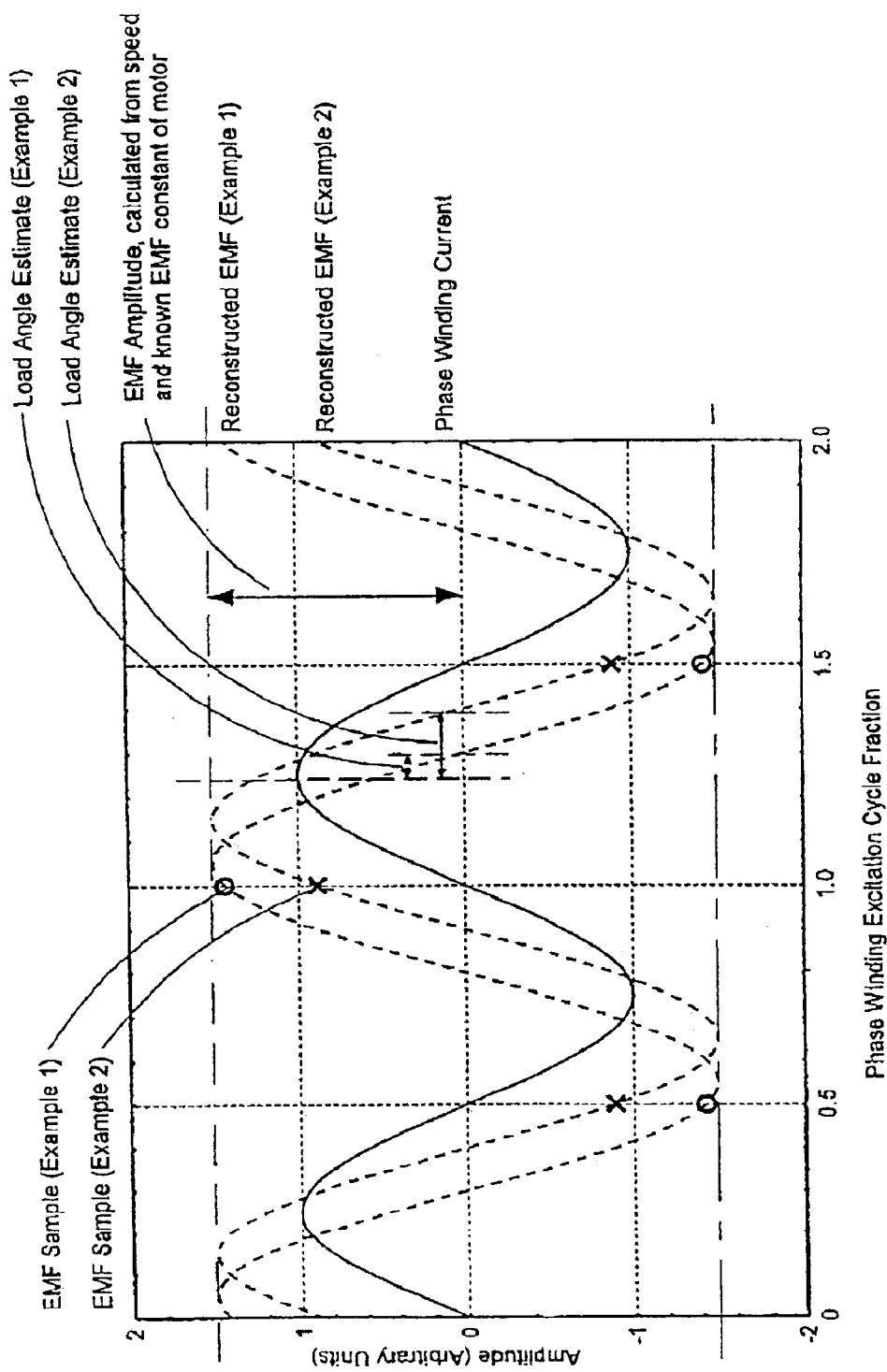
FIG. 3 illustrates the estimated rotational emf versus phase winding excitation cycle fraction for a hybrid stepping motor for two different load conditions.

FIG. 3 illustrates using the solid line the excitation current $i_A$ flowing in the windings of phase A of the hybrid stepping motor of FIG. 1. When the excitation current $i_A$ is zero, the contribution of the third term of equation (1), i.e. $i_A R_A$, to the terminal voltage $v_A$ will also be zero. Moreover, when the excitation current is zero, the inductance $L_A$ of the phase winding A is equal to the unsaturated inductance, which is linear and fully predictable or easily measured. Thus, the second term in equation (1) can be easily calculated.

The fourth term of equation (1) depends on the rate of change of the current in the second phase winding. In a motor with two phase windings the two phase currents will be 90° out of phase with each other. At the zero crossing of the current in the first phase, the current in the second phase will be a maximum and its rate of change will be zero. The third term in equation (1) is therefore zero at the chosen sampling points. Hence at the zero crossing of the current in the phase winding A, the equation (1) for the measured terminal voltage simplifies to $$v_{AT} = e_{AR} + L_A \frac{di_A}{dt} \quad (2)$$

Hence, measurement of the phase winding terminal voltage at these points allows the instantaneous value of the internally induced emf to be calculated.

The load angle δ may be computed from the samples of the instantaneous values of the internally induced emf, obtained at the points where the excitation current is zero. This is illustrated in FIG. 3 for a motor under two different load conditions, Example 1 and Example 2, with the calculated instantaneous emf values being identified by a "O" and an "X" respectively.

FIG. 3 illustrates, using broken lines, sinusoids fitted to the calculated instantaneous values of the rotational emf (the magnitude of the sinusoid is known to be a linear function of the rotational speed of the motor). The load angle for a given load corresponds to the phase difference between the zero crossing point of the fitted sinusoid and the point at which the excitation current is a maximum. It is noted that in FIG. 3, Example 2 represents a higher load than Example 1.

This method has the advantage that, as no compensation is required for the effect of the winding resistance, it is not necessary to measure the temperature of the winding. An additional benefit of this method is that, as the excitation currents are applied to the phase windings A and B in quadrature to one another, when the voltage is being measured across the terminals of one of the phases the rate of change of the current in the other phase is zero. Thus, any mutual inductance which is present between the windings of the two phases will have no effect on the measured terminal voltages.

Figure 4:
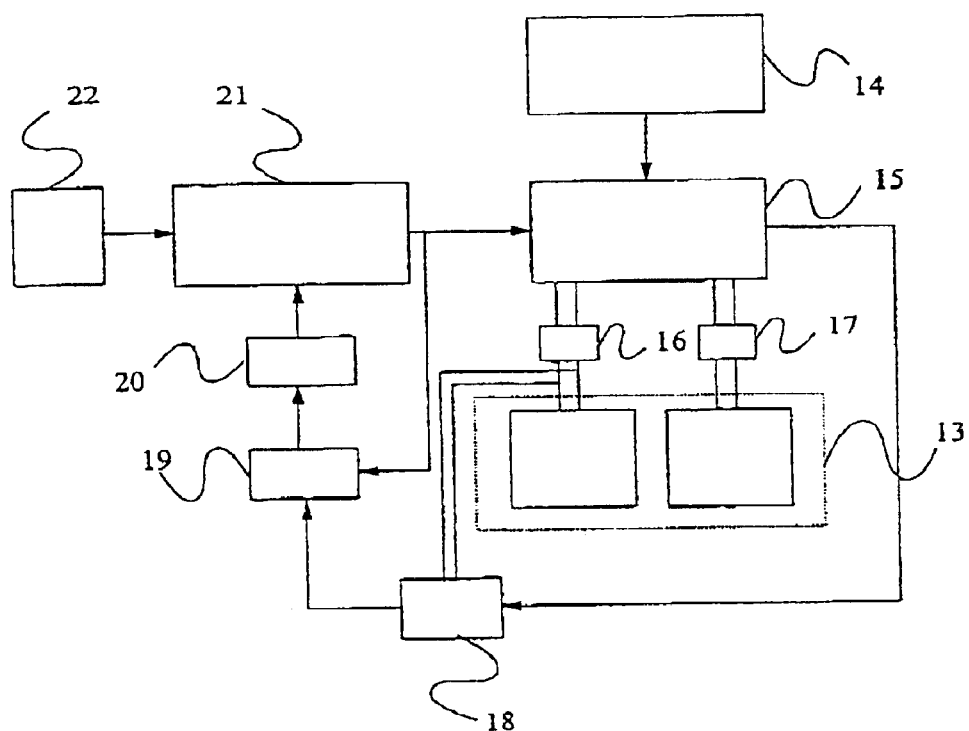
FIG. 4 illustrates a control system for a hybrid stepping motor according to an embodiment of the present invention.

FIG. 4 illustrates schematically a system for controlling a two-phase stepping motor 13. Electrical power is supplied to the two-phases A and B of the motor 13 from a mains supply 14 and a power converter 15, via respective sets of switches 16, 17 which act to reverse the direction of current flow in the phase windings. A sampling unit 18 is connected across the terminals of the phase A and receives timing signals from the power converter 15, such that the unit 18 samples the terminal voltage at each successive zero crossing point of the excitation current. The samples are provided at an output of the unit 18 and are passed to a correction unit 19. The correction unit 19 employs equation (2) above to compensate the results for the inductive effect (using a pre-stored or pre-calculated inductance constant), and passes the compensated results to a processing unit 20. The compensated results correspond to the instantaneous values of the rotational emf at the ample instants. The processing unit 20 fits a sinusoid to the stream of compensated results to derive a continuously varying estimate of the rotational emf, i.e. the rate of change of rotor flux linking the stator phase in question. This estimate is compared by the processing unit 20 to the excitation current waveform to determine the load angle δ.

The load angle δ is provided by the processing unit 20 to a drive controller 21. The drive controller 21 receives user settings of speed from a user control unit 22 and provides a drive control signal to the power converter 15 to vary the amplitude of the excitation current up or down so as to cause the load angle δ to approach the optimal value, i.e. around 80°. It will be appreciated that an increase in the magnitude of the excitation current will result in increases stator flux, decreasing the load angle for a the same synchronous speed, whilst a decrease in the excitation current will have the reverse effect.

An alternative method of computing the load angle for the phase A requires the integration of the measured phase terminal voltage $v_{AT}$ over the time period between two successive zero crossings of the phase excitation current $i_A$. Over this time period, the integral of the second term in equation (1) is zero. The integral of the mutual inductance term in equation (1) is not zero but, as the contribution of this term to equation (1) is small, an estimate can be made for this term from known details of the current and the value of the mutual inductance without seriously affecting the accuracy of the estimation of the remaining terms. The integral of the resistive voltage drop can be calculated from the known resistance of the phase winding though this must first be compensated for the motor temperature. Rearrangement of the integrated form of equation (1) gives an expression for the integral of the rotational emf of a phase winding over the specific time interval as shown in equation (3).

$$\int e_{AR} dt = \int v_{AT} dt - \int i_A R_A dt - \int M \frac{di_B}{dt} dt \quad (3)$$

The integral of the rotational emf calculated by equation (3) is actually the rotor flux linkage at the second of the two excitation current zero crossing points between which the phase terminal voltage was integrated. Alternatively, a value proportional to the excitation current may be subtracted from the measured phase voltage, prior to integrating the voltage, to remove the effect of the phase winding resistance.

Figure 5:
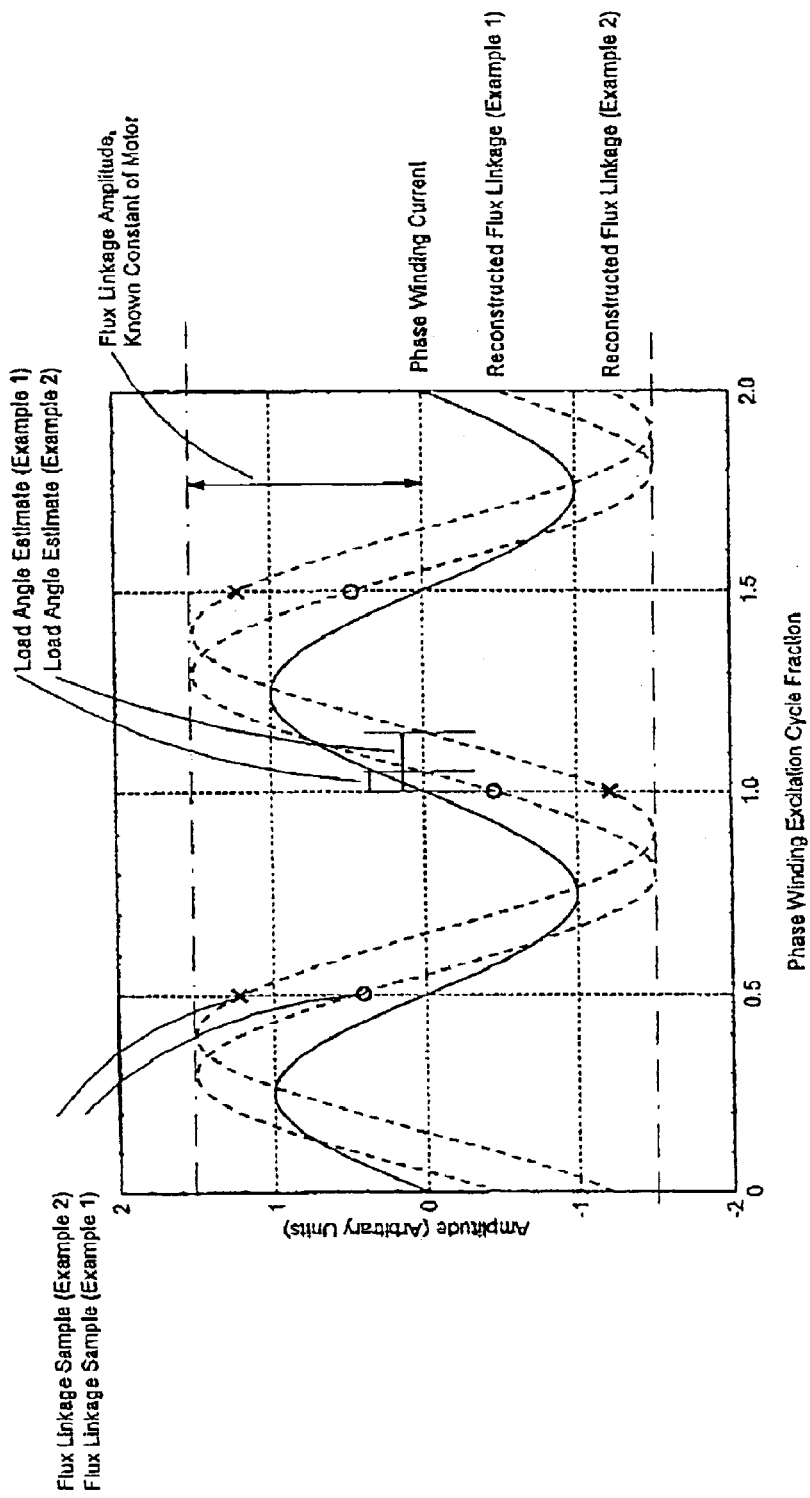
FIG. 5 illustrates the estimated flux linkage versus phase winding excitation cycle fraction for a hybrid stepping motor for two different load conditions.

The flux linkage due to the movement of the rotor within the stator varies approximately sinusoidally. It is therefore possible to approximate the continuously varying flux linkage due to this movement by fitting a sinusoid to the flux linkage values determined for successive zero current crossing points. This is illustrated in FIG. 5 for a motor under two different load conditions (Example 1 and Example 2). FIG. 5 also shows the excitation current $i_A$, from which it can be seen that the load angle δ is easily computed from the phase difference between the zero crossing points of the excitation current and of the fitted sinusoids.

For the purposes of clarity, the foregoing examples have described the fitting of a simusoidal function to the sampled data points. For certain motors with non-sinusoidal rotational emf waveforms, enhanced performance could be achieved by selecting a fitting function which more closely matches the emf characteristic of the motor.

Also for reasons of clarity, the examples show calculations based on the zero or near-zero points of the current waveform. The use of waveform reconstruction as described by the present invention may be applied to samples taken at any current, with the proviso that samples taken near zero will have greater accuracy than those where the current is non-zero.

When the discrete sample points are taken at non-zero current a further preferred measurement point is 45° either side of each zero crossing point (although the points may be varied by + or −10 degrees subject to the introduction of errors). If the currents in a two phase motor are quadrature sine waves (of equal amplitude), then choosing the discrete points to be 45° displaced from a zero crossing point will result in either the derivative terms or the resistive terms of two phase winding measurements being equal or opposite. The derivative terms of the two phase voltage equations can be cancelled by addition or subtraction leaving a value which is a function of the two phase winding back emfs and the resistive voltage drops in the two windings. If $i_A$ leads $i_B$ by 90° then 45° after the positive going zero crossing of $i_A$ there will be a point where the derivatives of $i_A$ and $i_B$ are both positive and of equal magnitude. If a measurement of each phase terminal voltage is made at that time then the difference between these two measurements is given by:

$$v_A - v_B = e_A - e_B + i_A R_A + i_B R_B$$

Since the resistive voltage drops can be estimated it is possible to derive an expression for the difference between the two phase windings' back-emfs. This difference will be a maximum (and equal to $\sqrt{2}$ times the peak value of either back-emf) when the load angle is 90° and the output torque is maximised. At load angles less than 90° the expression $e_A - e_B$ is reduced and its magnitude is a simple function of the load angle, δ, and is given by $$e_A - e_B = \sqrt{2} e_{max} \sin \delta$$

where $e_{max}$ is the peak value of $e_A$ (or $e_B$).

A similar function can be derived from the voltage samples taken 45° before the zero crossing of the current in phase A but the two measurements must be added to achieve the cancellation of the derivative terms.

It will be appreciated by the person of skill in the art that various modifications may be made to the above described embodiments without departing from the scope of the present invention. For example, rather than employing only one of the above described methods to compute the load angle, two or more methods may be used simultaneously. The results of the various methods could then be combined to determine an improved load angle estimation.

What is claimed is:

1. An electrical motor system comprising:
    a rotor and a stator, the stator having poles facing circumferential surfaces of the rotor so that the stator forms a magnetic circuit with the rotor, the stator further having stator coils grouped into one or more phase windings, which phase windings are separately energizable to induce stator magnetic fields which interact with magnetic fields of the rotor;
    voltage detecting means for detecting a voltage across the or at least one stator phase winding; and
    processing means for determining from one or more voltage measurements the rotor flux linking said stator phase winding, or a value which is a function of the rotor flux linkage, when the excitation current in said stator phase winding is at a known point in its cyclic variation chosen to substantially eliminate from the rotor flux or said function inductive and/or resistive contributions, and for determining from the rotor flux linkage or said function thereof the load angle of the motor,
    wherein the voltage detecting means or processing means receives timing signals identifying each occurrence of the known point.

2. A system according to claim 1, wherein said known point in the cyclic variation of the excitation current is when the excitation current is substantially zero.

3. A system according to claim 1, wherein the stator coils are grouped into two or more phase windings.

4. A system according to claim 2, wherein the voltage detecting means is arranged to sample the phase winding terminal voltage at those points where the excitation current is zero.

5. A system according to claim 4 and comprising correction means for correcting the sampled voltage measurements for the effect of the phase inductance.

6. A system according to claim 2, wherein the voltage is detected across a stator phase winding, the motor comprising integration means for integrating the voltage over the time period between two successive zero crossings of the phase winding excitation current waveform.

7. A system according to claim 6 and comprising correction means for correcting the result for the resistive volt drop by subtracting a value from the detected phase winding voltage which is proportional to the phase winding excitation current.

8. A system according to claim 6 and comprising correction means for correcting the integrated voltage for the resistive volt drop by subtracting a value related to a phase winding excitation current and integration period.

9. A system according to claim 1, wherein said processing means is arranged to determine the load angle from the flux linkage and/or rate of change of flux linkage in the phase winding.

10. A system according to claim 1, wherein said processing means is arranged to determine the load angle by fitting a known function to the flux linkage measurement, or function of the flux linkage, obtained at the known points in the cyclic variation of the phase winding excitation current.

11. A system according to claim 10, wherein said function is a sinusoid.

12. A system according to claim 1, wherein the electrical motor is a hybrid stepping motor.

13. A system according to claim 1, wherein said processing means determines from one or more voltage measurements a function which is the derivative of the rotor flux linkage or a combination of derivatives of the flux linkage of two or more phase windings.

14. A system according to claim 13, wherein the voltage detecting means is arranged to sample the stator phase winding terminal voltage at points substantially + or −45 degrees shifted from the zero crossing point(s) of the phase winding excitation current.

15. A system according to claim 14 and comprising means for correcting the sampled voltage measurement(s) for the effect of the phase resistance.

16. A system according to claim 14, wherein the stator coils are grouped into two or more phase windings and said voltage detecting means is arranged to sample voltages across the or at least two phase windings at points substantially + or −45 degrees shifted from the zero crossing point(s) of the phase winding excitation current, and said processing means is arranged to determine the load angle by adding or subtracting the simultaneous voltage measurements for the two phases.

17. A system according to claim 16, wherein the processing means is further arranged to fit a known function to the resulting sums and/or differences.

18. A system according to claim 17, wherein said function is a sinusoid.

19. A method of controlling an electrical motor which comprises a rotor and a stator, the stator having poles facing circumferential surfaces of the rotor so that the stator forms a magnetic circuit with the rotor, the stator further having stator coils grouped into one or more phase windings, the method comprising the steps of:

energising the stator phase winding(s) to induce stator magnetic fields which interact with magnetic fields of the rotor;

detecting a voltage across the or at least one stator phase winding;

determining from one or more voltage measurements the rotor flux linkage, or a value which is a function of the rotor flux linkage, when the excitation current in said stator phase winding is at a known point in its cyclic variation chosen to substantially eliminate from the rotor flux or said function inductive and/or resistive contributions; and determining from the flux linkage or said function thereof the load angle of the motor, wherein timing signals identifying each occurrence of said known point are used either in said detecting step or said processing step.

20. A control system for an electrical motor having a rotor and a stator, the stator having poles facing circumferential surfaces of the rotor so that the stator forms a magnetic circuit with the rotor, the stator further having stator coils grouped into one or more phase windings, which phase winding(s) is/are energizable to induce stator magnetic fields which interact with magnetic fields of the rotor, the control system comprising:

voltage detecting means for detecting a voltage across a stator phase winding; and processing means for determining from one or more voltage measurements the rotor flux linkage for said stator phase winding, or a value which is a function of the rotor flux linkage, when the excitation current in said stator phase winding is at a known point in its cyclic variation chosen to substantially eliminate from the rotor flux or said function inductive and/or resistive contributions, and for determining from the rotor flux linkage or said function thereof the load angle of the motor, wherein the voltage detecting means or the processing means receives timing signals identifying each occurrence of said known point.

21. An electrical motor system comprising:

a rotor and a stator, the stator having poles facing circumferential surfaces of the rotor so that the stator forms a magnetic circuit with the rotor, the stator further having stator coils grouped into two or more phase windings, which phase windings are separately energizable to induce stator magnetic fields which interact with magnetic fields associated with the rotor;

voltage detecting means for detecting a voltage across at least two stator phase windings at points substantially + or −45 degrees shifted from the zero crossing point(s) of the phase winding excitation current, the voltage detecting means receiving timing signals identifying each occurrence of a known point; and processing means arranged to determine the load angle by adding or subtracting simultaneous voltage measurements for the two phases.

22. A method of controlling an electrical motor which comprises a rotor and a stator, the stator having poles facing circumferential surfaces of the rotor so that the stator forms a magnetic circuit with the rotor, the stator further having stator coils grouped into two or more phase windings, the method comprising the steps of:

separately energising the stator phase windings to induce stator magnetic fields which interact with magnetic fields of the rotor;

sampling a voltage across at least two stator chase windings at times identified by timing signals identifying occurrences of known points in the cyclic variation of the excitation currents chosen to substantially eliminate from the rotor flux or said function inductive and/or resistive contributions; and determining from at least two voltage measurements a simple function of the load angle of the motor.

* * * * *